(12) United States Patent
Haulin

(10) Patent No.: US 9,356,721 B2
(45) Date of Patent: May 31, 2016

(54) METHODS AND APPARATUS FOR PRECISION TIME STAMPING

(71) Applicant: MARVELL WORLD TRADE LTD., St. Michael (BB)

(72) Inventor: Tord Haulin, Uppsala (SE)

(73) Assignee: Marvell World Trade Ltd., St. Michael (BB)

( * ) Notice: Subject to any disclaimer, the term of this patent is extended or adjusted under 35 U.S.C. 154(b) by 214 days.

(21) Appl. No.: 13/927,908

(22) Filed: Jun. 26, 2013

(65) Prior Publication Data

US 2013/0343409 A1 Dec. 26, 2013

Related U.S. Application Data

(60) Provisional application No. 61/725,159, filed on Nov. 12, 2012, provisional application No. 61/664,478, filed on Jun. 26, 2012.

(51) Int. Cl.
*H04J 3/06* (2006.01)
*H04L 7/00* (2006.01)

(52) U.S. Cl.
CPC ............ *H04J 3/0661* (2013.01); *H04J 3/0697* (2013.01); *H04L 7/005* (2013.01)

(58) Field of Classification Search
CPC ..................................................... H04J 3/0661
See application file for complete search history.

(56) References Cited

U.S. PATENT DOCUMENTS

| | | | | |
|---|---|---|---|---|
| 2003/0235216 A1* | 12/2003 | Gustin | .................. | H04J 3/0697 370/509 |
| 2004/0008973 A1* | 1/2004 | Marshall et al. | ................. | 386/85 |
| 2004/0141526 A1* | 7/2004 | Balasubramanian et al. | | 370/503 |
| 2005/0286507 A1 | 12/2005 | Sterling et al. | | |
| 2006/0164902 A1 | 7/2006 | Fung | | |
| 2007/0260906 A1* | 11/2007 | Corredoura | ................... | 713/400 |

(Continued)

FOREIGN PATENT DOCUMENTS

| | | | |
|---|---|---|---|
| DE | 10 2008026391 A1 | 12/2009 | |
| EP | 2254267 A1 | 11/2010 | |

(Continued)

OTHER PUBLICATIONS

IEC 62439-3, "Industrial communication networks—High availability automation networks—Part 3: Parallel Redundancy Protocol (PRP) and High-availability Seamless Redundancy (HSR)," *International Electrotechnical Commission*, pp. 1-62 (2010).

(Continued)

*Primary Examiner* — Chi H Pham
*Assistant Examiner* — Fahmida Chowdhury

(57) ABSTRACT

In a network device, apparatus and methods perform precision time stamping. A time agent receives a master pace signal corresponding to a time representation based on a master real time clock in a master clock domain. A time accumulator accumulates time units one fill quantum at a time based on the master pace signal. The time accumulator decreases the accumulated time units by a leak quantum according to a local clock signal running at a higher frequency than the master pace signal. Correction logic periodically generates, at a granularity corresponding to the frequency of the local clock signal, an updated time representation in a target clock domain based on a residual number of time units in the time accumulator before depositing an additional fill quantum of time units in the time accumulator.

21 Claims, 14 Drawing Sheets

(56) References Cited

U.S. PATENT DOCUMENTS

| | | |
|---|---|---|
| 2009/0310729 A1 | 12/2009 | Liu et al. |
| 2010/0162265 A1 | 6/2010 | Heddes |
| 2011/0228768 A1 | 9/2011 | Gelter et al. |
| 2012/0014377 A1 | 1/2012 | Joergensen et al. |
| 2013/0003757 A1* | 1/2013 | Boatright ............... H04J 3/0697 370/474 |
| 2013/0208735 A1 | 8/2013 | Mizrahi et al. |
| 2014/0153588 A1 | 6/2014 | Haulin |

FOREIGN PATENT DOCUMENTS

| | | |
|---|---|---|
| WO | WO-2012/065823 A1 | 5/2012 |
| WO | WO-2013/117997 A2 | 8/2013 |

OTHER PUBLICATIONS

IEEE Std. C37.238$^{TM}$-2011, "IEEE Standard Profile for Use of IEEE 1588$^{TM}$ Precision Time Protocol in Power System Applications," *Institute for Electrical and Electronics Engineers, Inc.*, pp. 1-66 (Jul. 2011).

IEEE P802.1AS/D0.8, "Draft Standard for Local and Metropolitan Area Networks-Timimg and Synchronization for Time-Sensitive Applications in Bridged Local Area Networks," *The Institute of Electrical and Electronics Engineers, Inc.*, pp. 1-149 (May 25, 2007).

Abstract of IEEE 82.1AS Standard, "802.1AS—Timing and Synchronization," *The Institute of Electrical and Electronics Engineers, Inc.*, available at <http://www.ieee802.org/1/pages/802.1as.html>, 1 page (Nov. 11, 2010).

IEEE Std 802.11e/D11.0, IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements, *The Institute of Electrical and Electronics Engineers, Inc.*, pp. 1-196 (Oct. 2004).

IEEE P802.16Rev2/D5 (Jul. 2008) (Revision of IEEE Std 82.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std. 1588$^{TM}$-2008 (Revision of IEEE Std. 1588-2002), "IEEE Standard for a Precision Clock Synchronization Protocol for Networked Measurement and Control Systems," The Institute for Electrical and Electronics Engineers, Inc., IEEE Standard, pp. 1-289 (Jul. 24, 2008).

Abdul, A., et al., "Integration of HSR and IEEE1588 over Ethernet networks," Proc. of the 2010 Int'l IEEE Symposium on Precision Clock Sychronization for Measurement, Control and Communication, pp. 77-82 (Sep. 27-Oct. 1, 2010).

Alizadeh, M., et al., "DCTCP: Efficient packet transport for the commoditized data center," *SIGCOMM*, pp. 1-15 (2010).

Appenzeller, G., et al., "Sizing router buffers," *SIGCOMM*, pp. 1-15 (2004).

Chin, W., et al., "IEEE 1588 Clock Synchronization using Dual Slave Clocks in a Slave," *IEEE Communications Letters*, vol. 13, No. 6, pp. 456-458 (Jun. 2009).

Corlett, A., et al. "Statistics of One• Way Internet Packet Delays", *Internet Engineering Task Force*, available at http://tools.ietf.org/id/draft-corlett-statistics-of-packet-delays-00.txt, pp. 1-9 (Aug. 2002).

Gurewitz, O., et al., "Estimating One-Way Delays from Cyclic-Path Delay Measurements," *Proc. of Twentieth Annual Joint Conf. of the IEEE Computer and Comm. Societies (IEEE INFOCOM 2001)*, vol. 2, pp. 1038-1044, (2001).

Gurewitz, O., et al., "One-Way Delay Estimation Using Network Wide Measurements," *IEEE Trans. on Information Theory*, vol. 52, No. 6, pp. 2710-2724 (2006).

Lee, S. "An Enhanced IEEE 1588 Time Synchronization Algorithm for Asymmetric Communication Link Using Block Burst Transmission," *IEEE Communications Letters*, vol. 12, No. 9, pp. 687-689 (Sep. 2008).

Lv, S., et al., "An Enhanced IEEE 1588 Time Synchronization for Asymmetric Communication Link in Packet Transport Network," *IEEE Communications Letters*, vol. 14. No. 8. pp. 764-766 (Aug. 2010).

Paxson, V., "End-to-End Internet Packet Dynamics," *IEEE/ACM Transactions on Networking*, vol. 7(3), pp. 277-292 (1999).

Mills, "Internet Time Sychronization: The Network Time Protocol," *Network Working Group Request for Comments*, No. 1129, pp. 1-29 (Oct. 1989).

Mills, D., et al., "Network Time Protocol Version 4: Protocol and Algorithms Specification," Request for Comments: 5905, *Internet Engineering Task Force (IETF)*, pp. 1-111 (Jun. 2010).

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS) pp. 1-6 (Sep. 24, 2012).

Mizrahi, T., "A Game Theoretic Analysis of Delay Attacks against Time Synchronization Protocols," Precision Clock Synchronization for Measurement, Control and Communication (ISPCS), International IEEE Syposium, pp. 1-6 (2012).

Mukherjee, A., "On the Dynamics and Significance of Low Frequency Components of Internet Load," Internetworking: Research and Experience. vol. 5. No. 4. pp. 163-205, (1994).

"netem," Linux Foundation, pp. 1-8 (Nov. 2009).

"Paragon-X," Calnex Solutions, pp. 1-2 (2010).

"ptpv2d Project Home Information," pp. 1-3 (2010).

Simanic, N., et al., "Compensation of Asymmetrical Latency for Ethernet Clock Sychronization," *Proc. of the 2011 Int'l IEEE Symposium on Precision Clock Synchronization for Measurement, Control and Communication (ISPCS)*, 2011, pp. 19-24 (2011).

Shpiner et al., "Multi-Path Time Synchronization," *Internet Engineering Task Force (IETF)*, pp. 1-15 (Oct. 15, 2012).

Tournier, et al., "Precise Time Synchronization on a High Available Redundant Ring Protocol," ISPCS 2009 *International IEEE Symposium on Precision Clock Synchronization for Measurement, Control and Communication*, Brescia, Italy, pp. 1-4 (Oct. 12-16, 2009).

Weber, K., et al., "High Availability seamless automation ring (Draft IEC 62439-3) and IEEE 1588 time sync dependencies," *Institute for Electrical and Electronics Engineers*, Inc, pp. 1-7 (Oct. 2010).

"Weighted mean," Wikipedia, pp. 1-10 (last updated Feb. 2013).

Zarick, R., et al., "The Impact of Network Latency on the Synchronization of Real-World IEEE 1588-2008 Devices," *Proc. of the 2010 Int'l IEEE Symposium on Precision Clock Synchronization for Measurement, Control and Communication*, pp. 135-140, (Sep. 27-Oct. 1, 2010).

Zhang, J., et al., "PDV-based PTP LSP Setup, Reoptimization and Recovery," *Internet Engineering Task Force*, pp. 1-17 (Oct. 2011).

ETSI EN 300 912, v7.3.0 *draft*, "Digital Cellular Telecommunications System (Phase 2+); Radio Subsystem Synchronization," (GSM 05.10 version 7.3.0 Release 1998), *European Telecommunications Standards Institute*, pp. 1-23 (May 2000).

ETSI EN 300 912, v8.3.1, "Digital Cellular Telecommunications System (Phase 2+); Radio Subsystem Synchronization," (GSM 05.10 version 8.3.1 Release 1999), *European Telecommunications Standards Institute*, pp. 1-24 (Oct. 2000).

ETSI TS 125 402, v3.0.0, "Universal Mobile Telecommunications System (UMTS); Synchronization in UTRAN Stage 2," (3G TS 25.402 version 3.0.0 Release 1999), *European Telecommunications Standards Institute*, pp. 1-30 (Jan. 2000).

ETSI TS 125 402, v4.3.0, "Universal Mobile Telecommunications System (UMTS); Synchronization in UTRAN Stage 2," (3GPP TS 25.402 version 4.3.0 Release 4), *European Telecommunications Standards Institute*, pp. 1-44 (Dec. 2001).

ETSI TS 125 105, v11.1.0, "Universal Mobile Telecommunications System (UMTS); Base Station (BS) Radion Transmission and Reception (TDD)," (3GPP TS 25.105 version 11.1.0 Release 11), *European Telecommunications Standards Institute*, pp. 1-121 (Oct. 2012).

(56) References Cited

OTHER PUBLICATIONS

ETSI TR 125 951, v7.0.0, "Universal Mobile Telecommunications System (UMTS); Base Station (BS) Classification" (3GPP TR 25.951 version 7.0.0 Release 7), *European Telecommunications Standards Institute*, pp. 1-63 (Jun. 2007).

ITU Recommendation G.707/Y.1322, "Network node interface for the synchronous digital hierarchy (SDH)," *Int'l Telecommunication Union*, pp. 1-196 (Jan. 2007).

ITU Recommendation G.707/Y.1322, *Amendment 2*, "Network node interface for the synchronous digital hierarchy (SDH)," *Int'l Telecommunication Union*, pp. 1-10 (Nov. 2009).

ITU Recommendation G.707/Y.1322, "Implementers' Guide for definitions and terms found in Recommendation ITU-T G.707/Y.1322," *Int'l Telecommunication Union*, pp. 1-6 (Jun. 2010).

ITU Recommendation G.781, "Synchronization layer functions," *Int'l Telecommunication Union*, pp. 1-124 (Sep. 2008).

ITU Recommendation G.781, *Corrigendum 1*, "Synchronization layer functions, Corrigendum 1," *Int'l Telecommunication Union*, pp. 1-8 (Nov. 2009).

ITU Recommendation G.811, "Timing Characteristics of Primary Reference Clocks," *Int'l Telecommunication Union*, pp. 1-11 (Sep. 1997).

ITU Recommendation G.812, *Erratum 1/Covering Note*, "Timing requirements of slave clocks suitable for use as node clocks in synchronization networks," *Int'l Telecommunication Union*, 1 page (Mar. 2005).

ITU Recommendation G.812, "Timing requirements of slave clocks suitable for use as node clocks in synchronization networks," *Int'l Telecommunication Union*, pp. 1-46 (Jun. 2004).

ITU Recommendation G.823, "The control of jitter and wander within digital networks which are based on the 2048 kbit/s hierarchy," *Int'l Telecommunication Union*, pp. 1-50 (Mar. 2000).

ITU Recommendation G.8261/Y.1361, "Timing and synchronization aspects in packet networks," *Int'l Telecommunication Union*, pp. 1-64 (May 2006).

ITU Recommendation G.8261/Y.1361, Corrigendum 1, "Timing and synchronization aspects in packet networks-13 Corrigendum 1," *Int'l Telecommunication Union*, pp. 1-6 (Dec. 2006).

ITU Recommendation G.8261/Y.1361, Amendment 1, "Timing and synchronization aspects in packet networks—Amendment 1: Network jitter limits for the synchronous Ethernet equipment clock interface and other clarifications," *Int'Telecommunication Union*, pp. 1-14 (Jul. 2010).

ITU Recommendation G.8262/Y.1362, "Timing characteristics of synchronous Ethernet equipment slave clock," pp. 1-34 (Jul. 2010).

ITU Recommendation G.8262/Y.1362, Amendment 1, "Timing characteristics of synchronous Ethernet equipment slave clock—Amendment 1," *Int'l Telecommunication Union*, pp. 1-8 (Feb. 2012).

ITU Recommendation G.8262/Y.1362, Amendment 2, "Timing characteristics of synchronous Ethernet equipment slave clock—Amendment 2," *Int'l Telecommunication Union*, pp. 1-12 (Oct. 2012).

ITU Recommendation G.8264/Y.1364, "Distribution of timing through packet networks," *Int'l Telecommunication Union*, pp. 1-36 (Oct. 2008).

ITU Recommendation G.8264/Y.1364, Corrigendum 1, "Distribution of timing through packet networks—Corrigendum 1," *Int'l Telecommunication Union*, pp. 1-10 (Nov. 2009).

ITU Recommendation G.8264/Y.1364, Amendment 1, "Distribution of timing through packet networks—Amendment 1: Use of synchronous Ethernet in a multi-operator context," *Int'l Telecommunication Union*, pp. 1-10 (Sep. 2010).

ITU Recommendation G.8264/Y.1364, Corrigendum 2, "Distribution of timing through packet networks—Corrigendum 2," *Int'l Telecommunication Union*, pp. 1-8 (Feb. 2012).

ITU Recommendation G.8264/Y.1364, Amendment 2, "Distribution of timing through packet networks—Amendment 2," *Int'l Telecommunication Union*, pp. 1-8 (Feb. 2012).

ITU-T Recommendation G.8265.1/Y.1365.1, "Precision time protocol telecom profile for frequency synchronization," *Int'l Telecommunication Union*, pp. 1-28 (Oct. 2010).

TIA/EIA-95-B, TR45 "Mobile Station-Base Station Compatibility Standard for Dual-Mode Wideband Spread Spectrum Systems," SP-3693-1, pp. 1-1202 (Oct. 31, 1998).

International Search Report and Written Opinion in corresponding PCT Application No. PCT/IB2013/001925, 18 pages (Mar. 14, 2014).

International Preliminary Report on Patentability in International Application No. PCT/IB2013/001925, dated Dec. 31, 2014 (12 pages).

Non-Final Office Action in U.S. Appl. No. 14/175,708, mailed Sep. 28, 2015 (21 pages).

\* cited by examiner

METHODS AND APPARATUS FOR PRECISION TIME STAMPING

CROSS-REFERENCES TO RELATED APPLICATIONS

The present application claims the benefit of U.S. Provisional Application No. 61/664,478, filed on Jun. 26, 2012, and U.S. Provisional Application No. 61/725,159, filed Nov. 12, 2012, the entire disclosures of which are hereby incorporated by reference herein in their entireties and for all purposes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices such as network switches, routers, edge devices, and the like employ timing mechanisms in which time stamp data are appended to or otherwise associated with data packets received at and/or transmitted from the network device, and with data packets as the data packets (or data representing the data packets) move through the various processing blocks of the network device. However, different processing blocks operate in different clock domains, complicating the distribution throughout the network device of a single time standard. Additionally, there are instances in which logic—minimal or not—exists between the point at which a time stamp is desired and the time at which the time stamp is desired to be accurate.

SUMMARY

In one embodiment, a method of determining a time representation in a network device includes receiving, at the network device, a master pace signal corresponding to a time representation based on a master real time clock in a master clock domain, the master pace signal being generated at a first frequency. The method also includes depositing in a time accumulator of the network device a fill quantum of time units based on the master pace signal, and decreasing the time units in the time accumulator by a leak quantum according to a local clock signal, the local clock signal running at a higher frequency than the master pace signal. Further, the method includes periodically generating, at a granularity corresponding to the frequency of the local clock signal, an updated time representation in the target clock domain based on a residual number of time units in the time accumulator before depositing an additional fill quantum of time units in the time accumulator.

In another embodiment, a network device includes a time agent configured to receive a master pace signal corresponding to a time representation based on a master real time clock in a master clock domain. The master pace signal is generated at a first frequency. The network device also includes a local clock generating a local clock signal in a target clock domain. The local clock signal is generated at a higher frequency than the master real time clock signal. A time accumulator in the network device is configured to (i) accumulate time units and to add a fill quantum of time units to the time accumulator based on the master pace signal and (ii) decrease the accumulated time units by a leak quantum according to the local clock signal. The network device further includes a real time clock in the target clock domain. The real time clock is configured to generate a time representation in the target clock domain. The real time clock in the target clock domain increments the real time representation in the target clock domain according to the local clock signal and the leak quantum. Correction logic in the network device is configured to generate, periodically and at a granularity corresponding to the frequency of the local clock signal, an updated time representation in the target clock domain based on a residual number of time units in the time accumulator before adding an additional fill quantum of time units in the time accumulator.

In still another embodiment, a method for determining time in a network device includes receiving, in a target clock domain of the network device, a check time signal generated in a master clock domain having a master clock signal. The method also includes strobing into a vernier register the value of the check time signal during each cycle of a local clock signal for the duration of the check time signal, and locating in the vernier register an indication of a phase shift between the check time signal and the local clock signal. The method further includes determining, according to the location of the phase shift in the vernier register, an adjustment such that an adjusted time representation generated in the target clock domain is accurate to a local clock sub-cycle degree of precision.

A network device comprises a time agent configured to receive a check time signal generated in a master clock domain having a master clock signal, in another embodiment. The network device also includes a local clock in a target clock domain generating a local clock signal, and a real time clock in the target clock domain configured to generate a time representation in the target clock domain. A vernier register is configured to receive the values of the check time signal during each cycle of the local clock signal for the duration of the check time signal, and logic is configured to locate in the vernier register an indication of a phase shift between the check time signal and the local clock signal. The network device further includes logic configured to determine, according to the location of the phase shift in the vernier register, an adjustment such that an adjusted time representation generated in the target clock domain is accurate to a local clock sub-cycle degree of precision.

In yet another embodiment, an apparatus includes a serializer/deserializer unit coupled to an adjustment unit. The adjustment unit is configured to generate a synchronization signal indicative of the cyclic delay variation of the adjustment unit. A time agent unit generates a time representation, and a time stamp unit coupled to the adjustment unit and to the time agent unit is configured to receive the synchronization signal and calculate an offset between (i) a time representation received concurrently with the detection of an SOP indicator and (ii) a time representation corresponding to a time at which a specific bit in a packet associated with a time stamp is transmitted or received in a serial bit stream.

In another embodiment, a method of determining an adjusted time representation in a network device includes receiving at a time stamp unit a time representation for a data packet including a start-of-packet indicator, and receiving at the time stamp unit a synchronization signal generated at an adjustment unit. The method also includes calculating, according to at least the synchronization signal, an offset between the time indicated by the time representation and a time at which a specific bit in the packet associated with time stamping was received as serial data at a serializer/deserializer unit. Further, the method includes generating the adjusted time representation according to the calculated offset, and associating with, appending to, processing, or inserting into the data packet time stamp data indicating the adjusted time representation.

In still another embodiment, a method of determining an adjusted time representation in a network device includes receiving at a time stamp unit a time representation for a data packet including a start-of-packet indicator, and receiving at the time stamp unit a synchronization signal generated at an adjustment unit. The method also includes calculating, according to at least the synchronization signal, an offset between the time indicated by the time representation and a time at which a specific bit in the packet associated with time stamping will be transmitted as serial data from a serializer/deserializer unit. Further, the method includes generating the adjusted time representation according to the calculated offset, and associating with, appending to, processing, or inserting into the data packet time stamp data indicating the adjusted time representation.

DETAILED DESCRIPTION

In embodiments described below, a network device receives and transmits data packets. For example, in embodiments, data packets are processed and/or are forwarded according to the type of information included in the data packet and/or according to the protocol embodied by the data packet. For applications such as network time protocols and performance monitoring, accurate recording of the time at which such packet pass measuring points is required. In the following such recording is referred to as time stamping.

Figure 1:
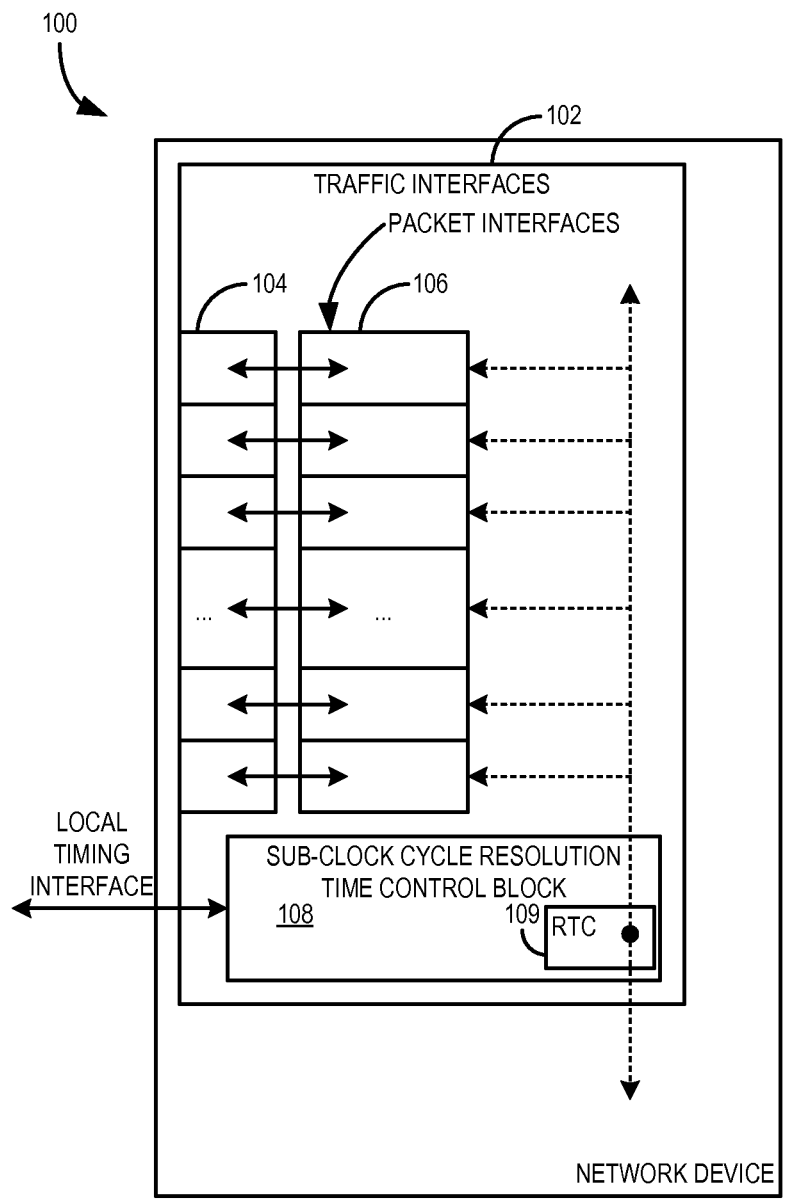
FIG. 1 is a block diagram of an embodiment of a network device configured to implement precision time stamping according to the present description.

FIG. 1 is a highly simplified block diagram depicting an embodiment of a network device 100, such as but not limited to a network processing unit (NPU), packet processor, network server, and the like, operating in accordance with the present description. It is noted that actual network devices typically include various additional components that are omitted from the disclosure to avoid obfuscating teachings of the present description. The network device 100 includes a traffic interface block 102 configured to receive and transmit data packets. In an embodiment, the traffic interface block 102 includes a set of serializer/deserializer units 104 (also referred to as a serdes). The serializer/deserializer units 104 receive serial data through one or more physical ports (not shown) of the network device 100 and convert the data into parallel form for other processing in the network device 100, and convert parallel data destined for transmission into serial data that can be transmitted through the one or more physical ports. The serdes units 104 are communicatively coupled to packet interface blocks 106. Among other things, the packet interface blocks 106 are responsible for at least a portion of the time stamping operations in the network device 100, as described below.

The TI block 102 also includes a time control block 108. The time control block 108 provides real time information to time stamp units in the packet interface block 106, and to various other parts of the network device 100.

A real time clock (RTC) 109 in the time control block 108 maintains a representation of current time in one or more formats. This is used for synchronization to or from external units or equipment, in an embodiment.

The time control block 108 controls the pace of all network device 100 real time clocks. Each RTC is synchronized to a primary reference source that is either remote or local. Remote synchronization is accomplished by way of a networking protocol for clock synchronization such as, for example, NTP (network time protocol) or PTP (precision time protocol). Local synchronization is accomplished using hardware interface signals, for example. In other clock domains within the network device 100 that require time stamp operations, the associated time stamp logic exists in two forms—one for receive (RX) links and one for transmit (TX) links. Throughout this document, the terms "clock signal," "clock cycle," and "clock domains" refer to synchronous digital logic design, while the terms "real time clock" and "time representation" refer to a sequence of time values representing absolute time at a defined point in each clock cycle of the clock domain in which the RTC resides. The term "time stamp" refers to a recording of the time at which the first data symbol of a data packet passes a specific point in the network device hardware. In order to capture a precise record of that time, the hardware must have a precise clock, synchronized to a master clock such as a remote atomic clock. The term "synchronization" refers to the action of setting a slave RTC to agree with a master RTC.

In embodiments, the network device time stamping is performed in two or more different clock domains that differ in frequency and/or phase. Therefore unique sequences of accurate RTC time values applying at a specific point in each cycle are required in each such clock domain.

In embodiments, a RTC is instantiated in each target clock domain, and each RTC advances in steps reflecting the discrete time steps of that clock domain. If, for example, the clocks in two target clock domains operate at exactly 100 MHz, in embodiments, the RTCs in both clock domains would advance the time representation by 10 ns for every cycle of the clock. Because of a phase offset however, the sequence of time values in the first example clock domain could be 61.23 ns, 71.23 ns 81.23 ns etc, while the other clock domain would for example need the sequence 66.765 ns, 76.765 ns, 86.765 ns etc. In an embodiment, all of the real time clocks in the various clock domains must be synchronized in this fashion. The methods described herein allow setting the time in the slave RTCs to match the right point in the cycle of the clock running in the target clock domain. That is, the time in the slave RTC can be adjusted with sub-clock-cycle resolution.

Figure 2:
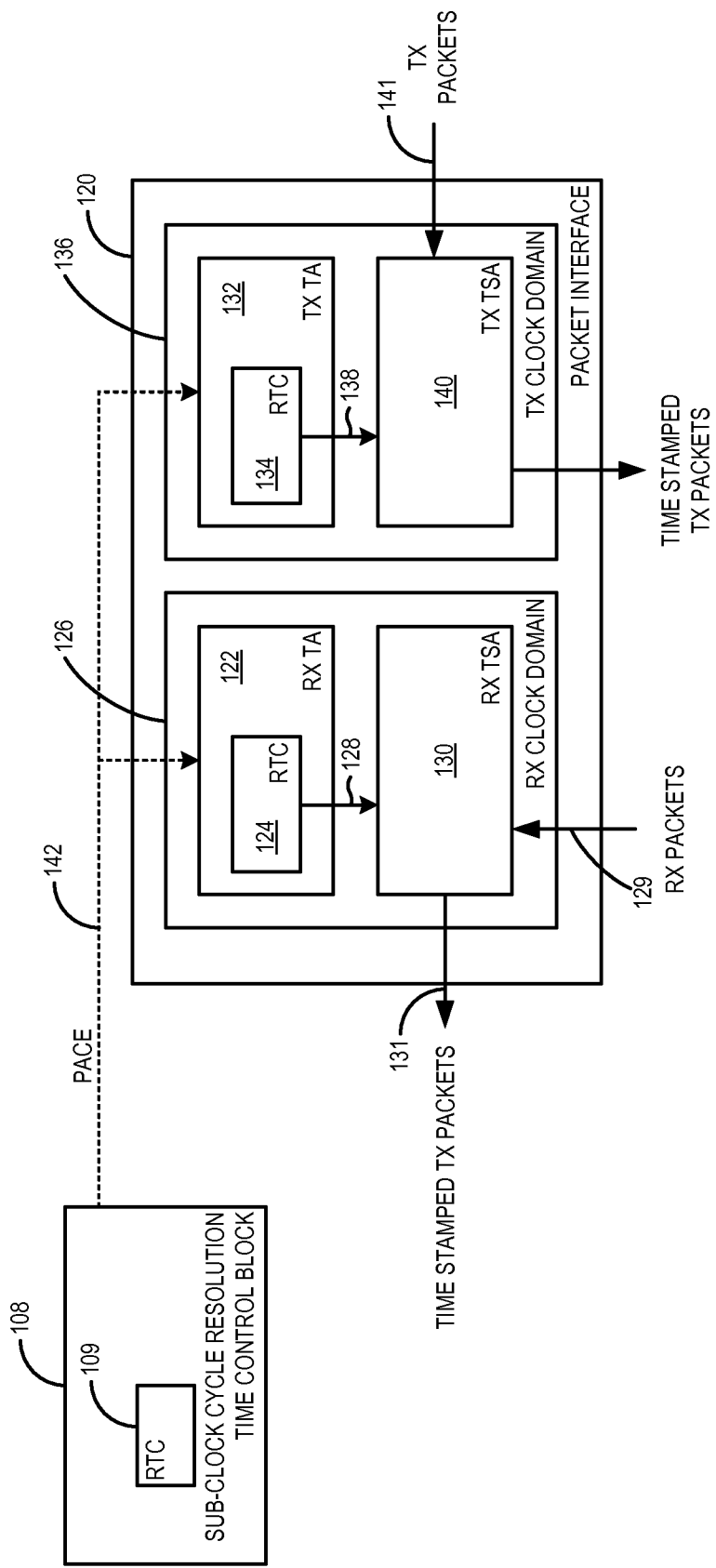
FIG. 2 is a block diagram depicting an example of an internally paced time stamp architecture implementing precision time stamping and depicting receive (RX) and transmit (TX) time agents (TAs) and time stamp agents (TSAs)

FIG. 2 depicts a block diagram of an embodiment of the sub-clock-cycle resolution time control block 108 and an embodiment of a packet interface 120, configured for internal synchronization of the packet interface RTCs to an RTC in the time control block 108. As depicted in FIG. 2, the packet interface 120 includes both RX and TX hardware. An RX time agent (TA) 122 includes an RTC 124 operating in an RX clock domain 126. The RX TA 122 provides a time representation 128 to an RX time stamp agent (TSA) 130 also in the RX clock domain 126. The RX TSA 130 uses the time representation 128 to associate time stamp information to the time of receipt of receive packet data. Similarly, a TX time agent 132 includes a slave RTC 134 operating in an TX clock domain 136. The TX TA 132 provides a time representation 138 to a TX time stamp agent 140 also in the TX clock domain 136. The TX TSA 140 uses the time representation 138 to add or manipulate time stamp information of selected transmit packet data before sending time stamped data packets 139 for transmission. The time control block 108 is communicatively coupled to the packet interface 120 and, in particular, sends a pace signal 142 to the RX and TX time agents 122 and 132, respectively.

Figure 3:
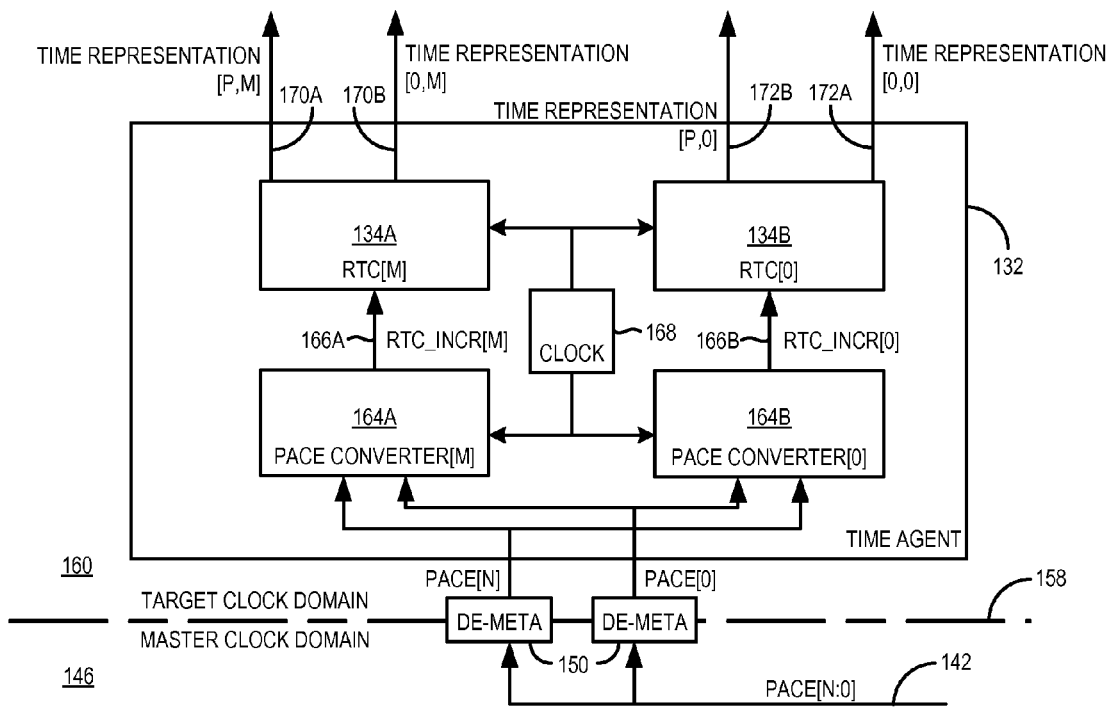
FIG. 3 is a block diagram of an example of the TX TA depicted in FIG. 2.

In some embodiments, the TA 132 outputs a time representation in a single time format, while in other embodiments, the TA 132 outputs the time representation in multiple formats. The time agent as depicted in more detail in FIG. 3, derives one or more RTC time sequences from the pace signal 142. A single RTC 134 can output multiple Time Sequences [p] that are harmonics to a common time scale. An additional pace converter 164 and RTC 134 are needed for each set of required output Time Sequences [m] that do not share harmonics. In the embodiment shown in FIG. 3, this is illustrated by the two RTCs 134A and 134B incremented by pace converters 164A and 164B. After meta-stability mitigation in the blocks DE-META 150, when crossing a clock domain boundary 158 between the master clock domain 146 and the target clock domain 160 of the TA 132, the pace signal 142 is received by pace converters 164A and 164B in TA 132, which decode the pace signal 142 and use the pace signal 142 to adjust increment values 166A and 166B provided to respective real time clocks 134A and 134B, by which each respective RTC 134 is incremented each cycle of a clock 168 in the clock domain 160. In the embodiment depicted in FIG. 3, two RTCs 134A and 134B outputting time sequences 170A, 170B and 172A, 172B respectively are shown.

Figure 4:
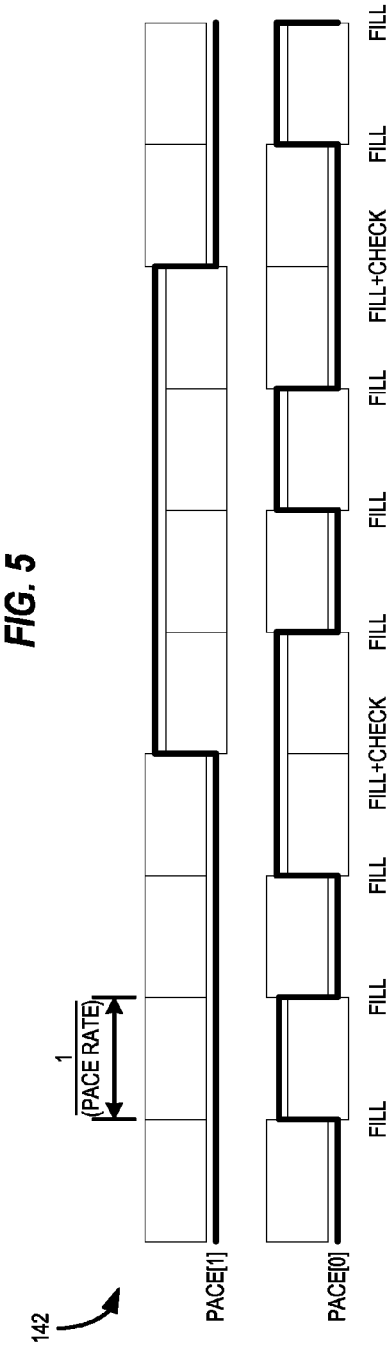
FIG. 4 illustrates an example composite pace signal distributed to the time agents depicted in FIG. 2.

While the pace signal 142 is implemented in various ways in corresponding various embodiments, an example pace signal 142 is illustrated in FIG. 4. In an embodiment, the pace signal carries one of two messages: "fill" or "fill+check." Each "fill" message corresponds to the passage of time equal to 1/(pace rate), an amount that is encoded in, for example, a register in the target clock domain. The "fill+check" message is used for synchronization, as will be described below. In the embodiments shown in FIG. 3, that applies to the clock 168 of the target clock domain 160.

Figure 5:
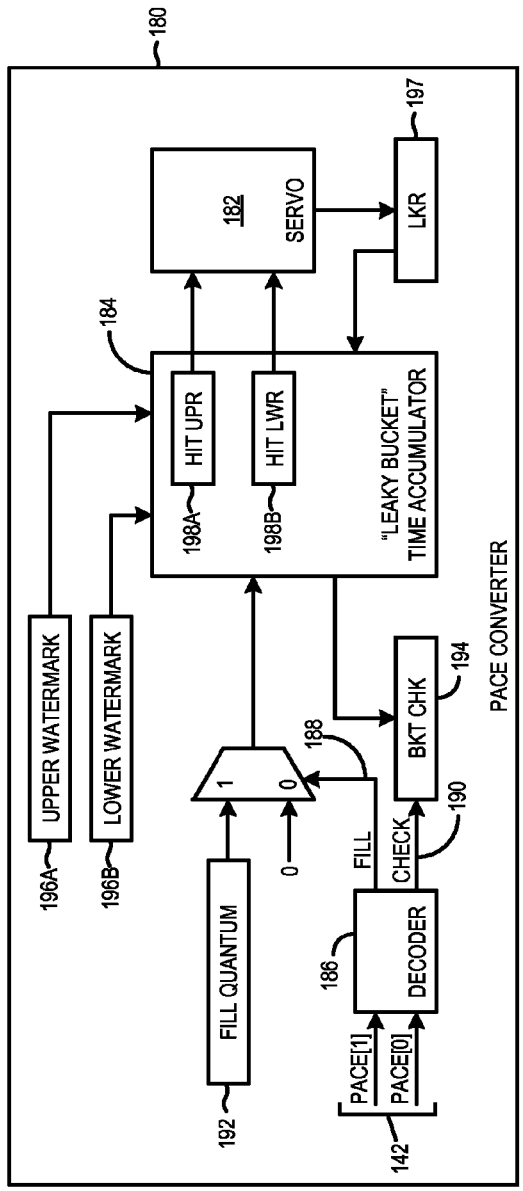
FIG. 5 is a block diagram of an example pace converter implemented in the time agents depicted in FIG. 2.

The pace signal 142 is decoded in the pace converters 164, in an embodiment. FIG. 5 is a block diagram depicting an example pace converter 180. In the example, the pace converter 180 employs a servo 182 and a "leaky bucket" 184. The servo 182 is implemented in hardware and controls an accurate estimate of the target domain cycle time. Specifically, the servo 182 makes use of the "leaky bucket" 184 which is drained each cycle of the target domain clock by an amount of time units reflecting the cycle time of the target domain clock, and expressed in the resolution of the desired time format. The servo 182 adjusts the leak rate of the bucket 184 such that the bucket fill level is maintained between two thresholds (an upper watermark and a lower watermark). The number of filled time units reflects the elapsed time between fill instants. In the depicted embodiment, a decoder 186 receives a pace signal 142 (as exemplified by FIG. 4) and outputs, separately, a fill signal 188 and a check signal 190. The fill signal 188 causes the addition to the bucket 184 of a number of time units stored as a "fill quantum" in a fill quantum register 192. At the same time, the check signal 190 causes the level of the bucket 184 to be recorded in a register 194. Registers 196A and 196B specify the upper and lower watermarks/thresholds for time accumulated in the bucket 184. Registers 198A and 198B reflect whether the time accumulated in the bucket 184 is currently above the upper threshold 196A or below the lower threshold 196B, respectively. The values of the registers 198A, 198B are received by the servo 182, which uses the values to adjust a leak rate stored in a register 197, the value of which controls the leak rate of the bucket 184 and, in embodiments, also specifies the amount that the RTC advances the time representation for each cycle of the local clock signal. Because the bucket filling interval is precisely controlled, the fill amount can be defined in the target domain. Accordingly, only the fill command needs to be transferred to the target domain.

The pace of the time agent RTC 124, 134 is set by a pace register (e.g., the register 197), which is maintained by hardware to reflect the target domain cycle time, in embodiments. The time representation of the target domain RTC (e.g., the RTC 124 or the RTC 134) is advanced each cycle of the target clock domain by the value of the pace register. In embodiments, the pace register determines the leak rate for the leaky bucket 184 or, alternatively, the register 197 determines the pace of the time agent RTC 124, 134. The exact amount of time units to deposit in the bucket 184 with each fill command from the pace signal is set by the register 192. The servo 182 adjusts the leak rate (e.g., the register 197) to keep the level of time units in the bucket 184 between the two configurable water marks specified by the registers 196A, 196B. In some embodiments, a single pace converter 180 is implemented, while in other embodiments multiple pace converters 180 are implemented. The buckets 184 in all pace converters 180 in a time agent 132 are filled using the same pace signal 142.

In some embodiments, the RTCs 124, 134 in the target clock domains 126, 136 are adjusted with sub-cycle precision. That is, in the target clock domains 126, 136, the time representation in each RTC 124, 134 is valid at a particular point in the clock cycle of that target clock domain, as a result of the discrete time steps with which the RTC 124, 134 advances the time representation. The point in the clock cycle at which the time representation is valid, however, varies as a result of offsets between the master and target clock domains.

In embodiments, the phase difference between the clocks in the master and target clock domains can be determined and, accordingly, the RTC time representation value can be adjusted. Specifically, in the target domain clock cycle, the fill level of the bucket 184 is strobed into the register 194 each time the check signal 190 is encoded in the pace signal 142. The amount of phase shift the check time edge is subjected to when being synchronized to the target clock domain is reflected by the bucket fill level at fill time. The adjustment is added to the RTC value to get the proper check time value with full sub-cycle precision, in embodiments. In some embodiments the adjustment is performed in hardware. In other embodiments the adjustment is performed by software.

Figure 6:
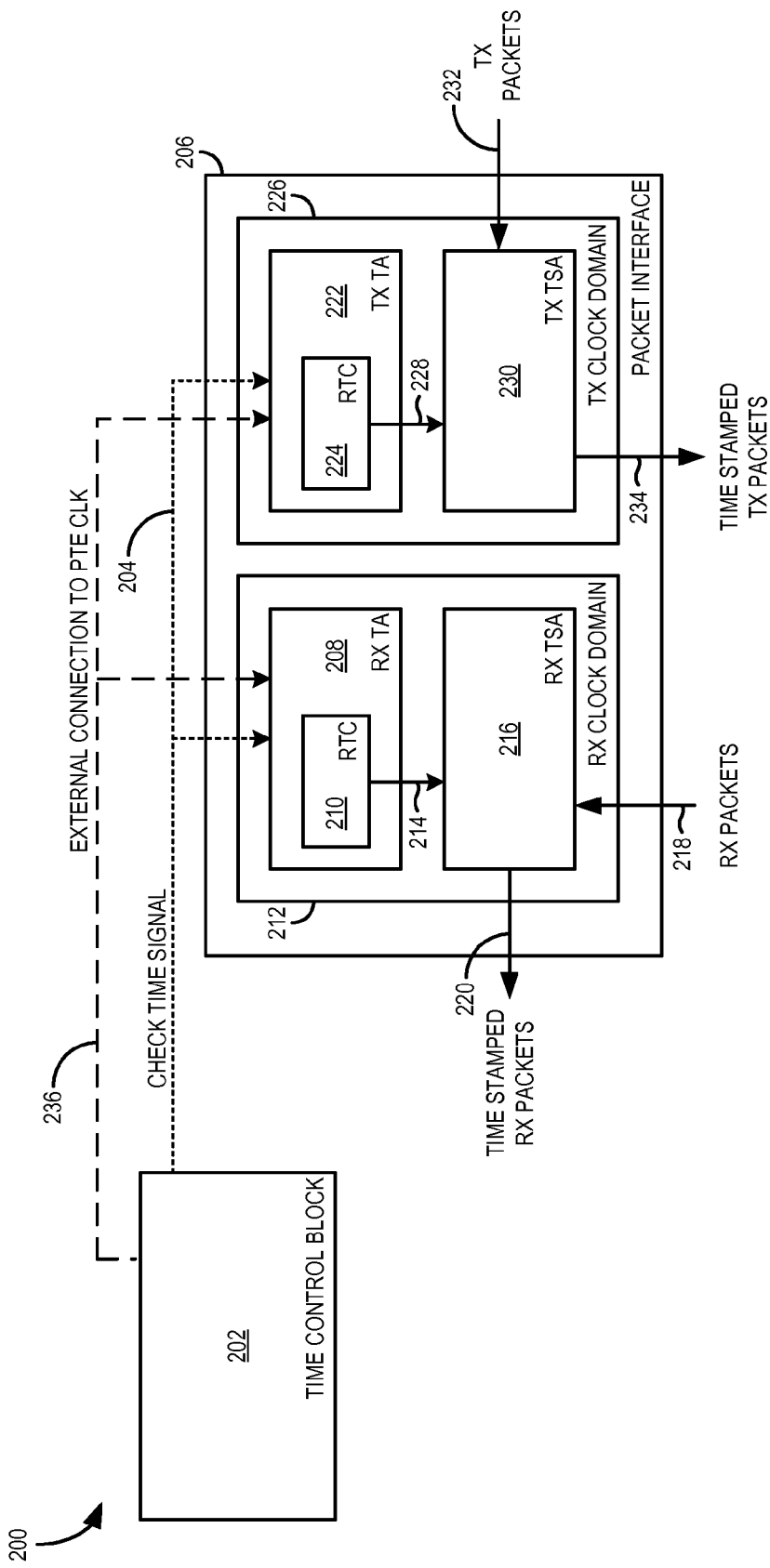
FIG. 6 is a block diagram of an example of an externally paced time stamp architecture implementing precision time stamping and depicting RX and TX TAs and TSAs.

FIG. 6 depicts a block diagram of an embodiment 200 in which the time control block 108 and an embodiment of a packet interface 120 are both configured for external synchronization between the respective RTCs. In the embodiment 200, a time control block 202 outputs a check time signal 204 to a packet interface 206. Similar to the packet interface 120 depicted in FIG. 2, the packet interface 206 includes both RX and TX hardware. A RX time agent (TA) 208 includes a slave RTC 210 operating in an RX clock domain 212. The RX TA 208 provides a time representation 214 to an RX time stamp agent (TSA) 216 also in the RX clock domain 212. The RX TSA 216 uses the time representation 214 to associate time stamp information with the receive packet data 218. Similarly, a TX time agent (TA) 222 includes a slave RTC 224 operating in a TX clock domain 226. The TX TA 222 provides a time representation 228 to a TX time stamp agent (TSA) 230 also in the TX clock domain 226. The TX TSA 230 uses the time representation 228 to add time stamp information to transmit packet data 232 before sending the time stamped data packets 234 for transmission. The time control block 202 is communicatively coupled to the packet interface 206 and, in particular, sends the check time signal 204 to the RX and TX time agents 208 and 222, respectively. In the embodiment of FIG. 6 the time control block 202 is coupled to the target domain reference clock via an external connection 236.

In the embodiment 200 of FIG. 6, syntonization of the RTCs is accomplished by locking together PLLs for the different clock domains, Then the Time Control Block 202 provides a check time signal 204 for phase synchronization. The Time Control Block 202 occasionally or periodically outputs a check time signal 204, which is received by the Packet Interface 206 and, in particular, by the RX TA 208 and the TX TA 222.

Figure 7:
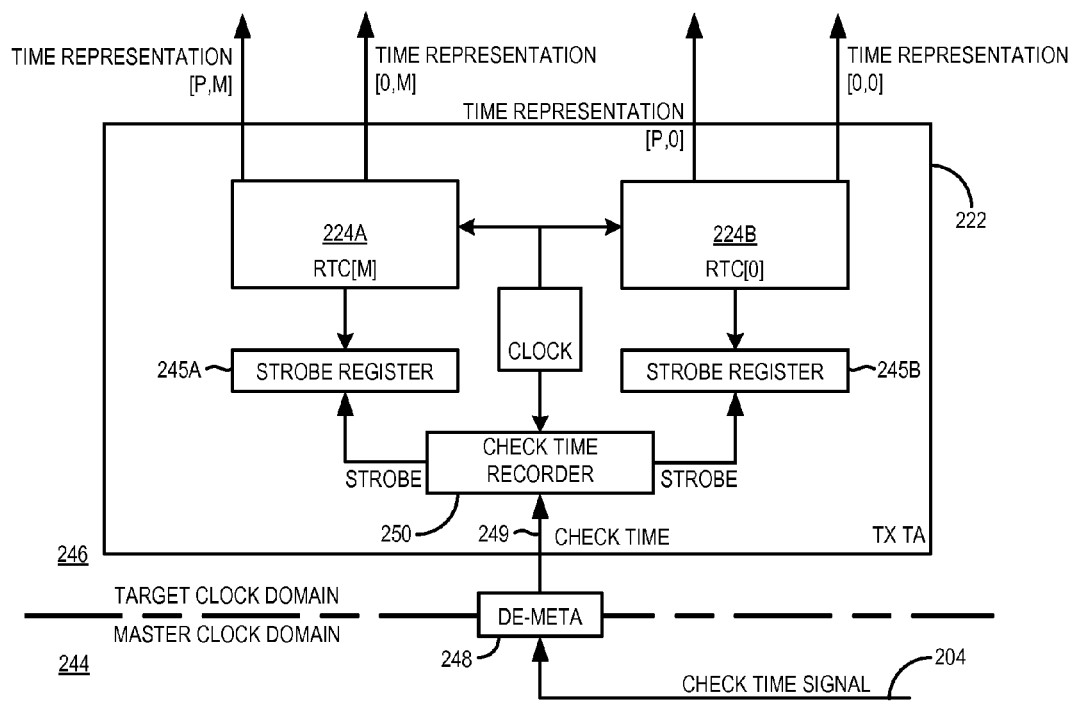
FIG. 7 is a block diagram of an example of the TX TA depicted in FIG. 6.

The block diagram in FIG. 7, a depicts an example of the TA 222 in accordance with another embodiment. The TA 222 receives the check time signal 204 through de-meta circuitry 248. A check time recorder 250 receives a check time signal 249. The check time signal 249 comprises two parts, a strobe command and a vernier scale sequence function. In the target clock domain cycle in which the strobe command is received, the values of all RTCs are strobed into strobe registers 245. The strobed value is used for checking the correctness of the RTC down to a resolution of ± the target clock domain cycle time, in an embodiment. The vernier scale sequence begins at the strobe instant and runs for n cycles. For the duration of this sequence its sampled value in the target clock domain is recorded in a vernier sample register.

Figure 8:
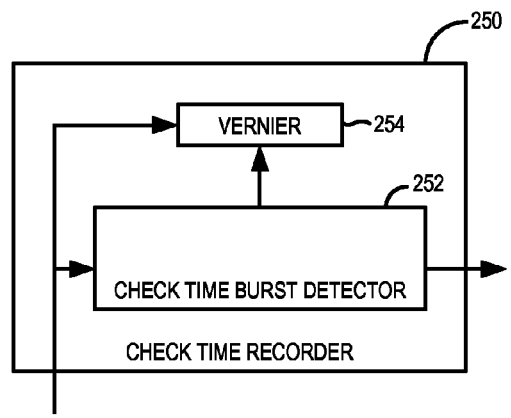
FIG. 8 is a block diagram of the check time recorder of FIG. 7.
Figure 9:
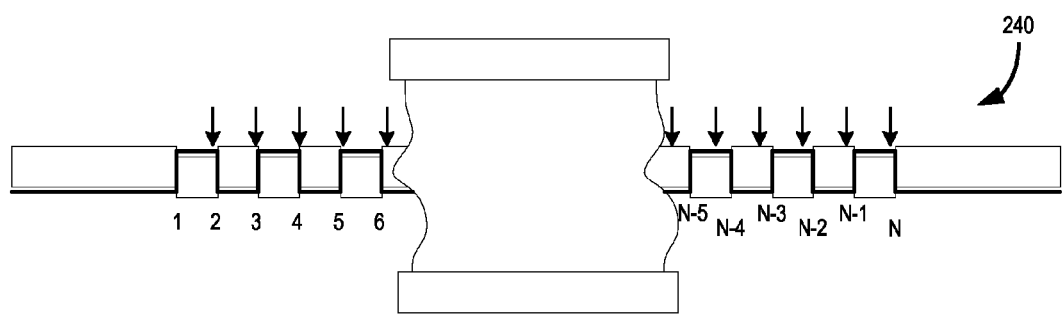
FIG. 9 illustrates an example check time signal distributed to the time agents depicted in FIG. 6.

FIG. 8 depicts an embodiment where the two functions of the check time signal 204 have been merged into a composite signal. The onset of a pulse train defines the strobe cycle and the rest of the check time signal provides the vernier sequence. It is a pulse train at a frequency similar to the frequency, or some suitable harmonic of the clock frequency of the target clock domain. In embodiments, the frequency of the check time pulse train is selected to provide a particular per-cycle offset between the pulse train and the clock signal in the target clock domain, such that a sub-cycle resolution can be achieved to provide adjustments to a slave RTC with sub-cycle accuracy, as described below. In embodiments, the pulse train includes n toggles, as depicted in the example pulse train 240 illustrated in FIG. 9. The frequency and number of toggles n is determined such that, for the target clock domain, the pulse train will include at least one phase shift. For example, the pulse train clocked into the target clock domain would be " . . . 1 0 1 0 1 0 0 1 0 1 0 1 0 . . . " or " . . . 1 0 1 0 1 0 1 1 0 1 0 1 0 1 . . . " This is referred to throughout the remainder of this specification as a "slip." In the embodiment depicted in FIG. 8, the check time recorder 250 includes a check time burst detector 252, which receives the check time signal 249 and, upon sampling the first toggle of the check time pulse train, strobes the value of the TX RTCs 224A, 224B into corresponding check time registers. The pulse train is then sampled/recorded into a shift register 254. Again, the frequency difference between the check time pulse train 204 and the target domain clock signal used for sampling the incoming check time pulse train 204, will cause there to be at least one slip in the recorded pulse train. The position of the slip in the vernier register 254 is indicative of the position in the target clock cycle where the check time command 204 arrived, and is used to compute errors of the RTC, and an adjustment is applied relative to the unadjusted RTC.

It is noted that this "vernier" method is applicable also to the internally paced control methods described above with respect to FIGS. 2-4. However, as described above, the bucket level at fill time is also a measure of the phase relation. In such embodiments employing the vernier method in combination with the leaky bucket method, the check time command 204 must be guaranteed to arrive to the target clock domain in the very same cycle as the fill command 188. This can be accomplished, for example, using standard procedures for asynchronous transfer of bus signals or by encoding the two operations to a single composite signal.

In embodiments, every target clock domain in which time stamp operations are performed has a time agent and a time stamp agent. During each cycle in the target clock domain, the time agent provides a time representation, in one or more formats, applying at a defined point in that clock cycle, to the time stamp agent. In embodiments, time stamp agents come in two varieties: a first type of time stamp agent (RX) provides time stamps as side band information for further processing; a second type of time stamp agent (TX) performs arithmetic operations on time stamp data, inserting results into packets in transit.

It is noted that data are transmitted and received over physical networks as serial data. As the data arrive at a network device, the serial data are converted by a serializer/deserializer (e.g. the serdes 104) into parallel words of data, which are generally processed as parallel data throughout the remainder of the network device. Data to be transmitted over physical networks from the network device are prepared in parallel form and then converted to serial data (by a serializer/deserializer). For some applications of time stamping, the time stamp agent can be located at the point in the device such that recorded or inserted time stamp data correspond to the desired point of time stamping. In other cases it can be inconvenient or impossible to record or insert time stamp data while the packet is passing the desired point of time stamping. An example of this is time stamping at a physical port of the network device 100. The point of time stamping can however be shifted further into the network device if the transport delay for packet data between the desired and actual points of time stamping is constant. Embodiments deploying such time stamping can apply a constant offset to the time stamp value in software and/or hardware to compensate for the transport delay.

Figures 10A, 10B:
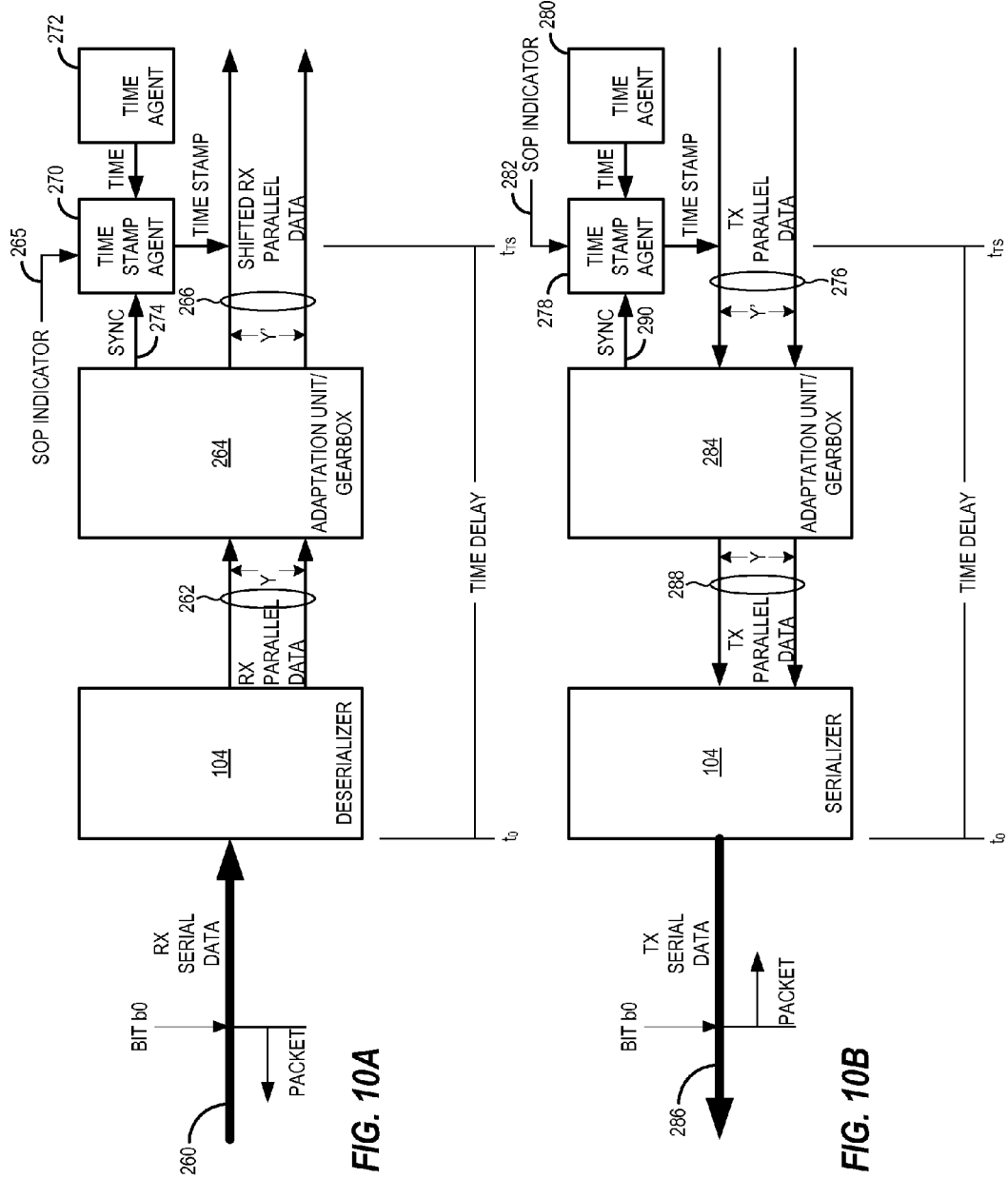
FIG. 10A is a block diagram of an example receive data path in accordance with an embodiment.
FIG. 10B is a block diagram of an example transmit data path in accordance with an embodiment.
Figure 11:
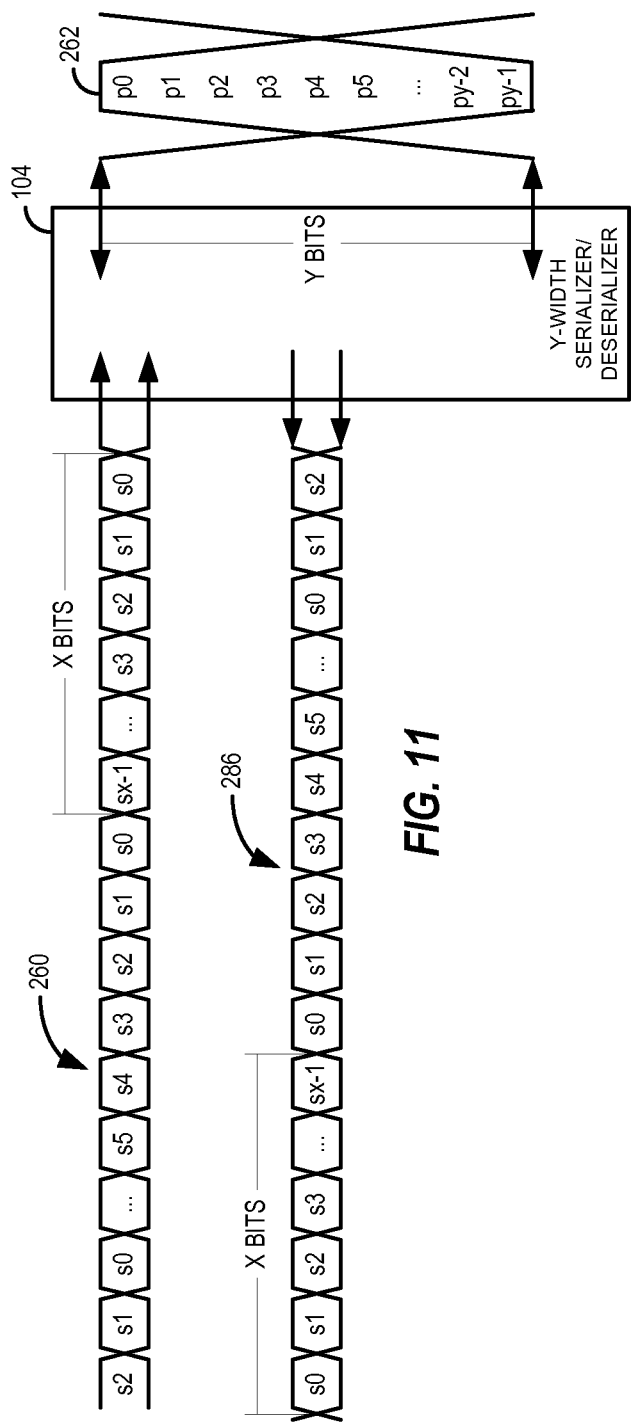
FIG. 11 illustrates example data streams in a portion of the data paths depicted in FIGS. 10A and 10B.

In embodiments, such as that depicted in FIG. 10A, a received data packet 260 arrives, as a serial stream of data, at a network device and, specifically, at the serializer/de-serializer unit 104 of the network device. With reference also to FIG. 11, when data packets are transported on the physical layer, the data is organized as blocks of data bits with a specific encoding, according to an embodiment. Time stamping is associated with a specific bit b0 in a specific such code block in the packet, according to an embodiment. The length of such bit pattern blocks is different for different types of physical ports, according to an embodiment. For a given port, however, the pattern length is fixed to x bits, according to an embodiment. The serdes unit 104 de-serializes the serial data, converting the serial data to parallel words of data 262. Each parallel word of data 262 output by the serdes unit 104 has a word width of y bits, where y is a fixed value according to the design of the serdes unit 104. In at least some embodiments where x and y are the same, the bit b0 in the pattern associated with time stamping will always be found in the same location of a specific parallel word in the receive data 262. Then the transport delay for the bit pattern block through the serdes is constant. In at least some embodiments where x and y are not the same, position of the code blocks in the parallel word data 262 varies from one parallel word to another. This is not well suited for parallel data processing, at least in some implementations and/or embodiments. Therefore, some embodiments of packet interfaces implement an adaptation unit or "gearbox" 264 that receives the parallel word data 262 from the serdes unit 104, detects the location of bit pattern blocks, and outputs shifted parallel word data 266 with bit pattern block aligned such that delineation points between code blocks always fall at the same location in each parallel a word of data 266. The gearbox operation involves temporary storage of wrap around bits. This makes the propagation delay through serdes and gearbox vary over time.

FIG. 10A conceptually shows an embodiment deploying an adaptation unit or gearbox 264. Time stamping occurs "inside" of the adaptation unit/gearbox 264 and, in embodiments, further inside of fixed delay logic analyzing or processing the parallel data. Time stamping is triggered by a start-of-packet (SOP) indicator 265. In embodiments, the time stamp value is adjusted to apply at a configurable offset from the SOP indicator 265. For Ethernet physical ports this can be the first bit b0 of the first symbol following the start-of-frame (SFD) delimiter. In embodiments, the SOP indicator 265 is generated by logic analyzing or controlling the parallel data 266. In other embodiments, a SOP indication is triggered in the time stamp agent 270 (as where the time stamp agent 270 is configured to read the parallel data words 266 and detect in the data packet the SOP indicator 265). In any event, at a time $t_{TS}$, the time stamp agent 270 records a time stamp for the data packet when the SOP indicator 265 is detected and other time stamp criteria are fulfilled. In some embodiments, the adaptation unit or gearbox 264 additionally generates and outputs a sync signal 274. The time stamp agent 270 receives the sync signal 274 and, using the sync signal 274 and the SOP indicator 265, can adjust the time representation received from the RTC in the time agent 272 such that the time stamp (at $t_{TS}$) that the time stamp agent 270 associates with the data packet corresponds to the time, $t_0$, at which bit b0 of the data packet arrived at the serdes unit 104. That is, the time stamp agent 270 can determine time $t_0$ based on the sync signal 274 from the adaptation unit 264 and the time representation from the time agent 272, and apply a time stamp at time $t_{TS}$ that indicates the time $t_0$. In some embodiments in which the unit 264 is an adaptation unit, the sync signal 274 indicates the number of bits by which the adaptation unit 264 shifted the received parallel data 262 in order to output the shifted parallel data 266.

A similar sequence is implemented, in embodiments, for outgoing data packets, as depicted conceptually in FIG. 10B. Specifically, as parallel word data 276 destined for transmission across a serial medium is processed, a time stamp is recorded, processed and inserted in the packet. The effective time stamp value then does not indicate the time when the time stamp was applied, but an adjusted value indicating the time at which bit b0 of the data packet will be transmitted as serial data. Parallel word data 276, of word width y', receives, at time $t_{TS}$, processed time stamp data from a time stamp agent 278 coupled to a time agent 280 having a real time clock. An SOP indicator 282, in combination with criteria identifying packets for time stamping, instructs the time stamp agent 278 to take action. Using a sync signal 290 from an adaptation unit or gearbox 284, the time stamp agent 278 predicts, based on knowledge of the logic between the time stamp agent 278 and a serial data stream 286, the point at which bit b0 of the data packet will be transmitted over the serial stream 286.

In the transmit direction as conceptually depicted in FIG. 10B, the adaptation unit or gearbox 284 receives the time stamped parallel word data 276, having word width y', and outputs parallel words 288 of data having a word width y that corresponds to the width of the parallel input of the serializer/deserializer unit 104 (see, again, FIG. 11). Because of the difference between the parallel data 276 and the parallel data 288, and because the packet data symbols or code blocks may have a different length, bit b0 of each data packet will not always be aligned at the same point in the parallel word 288 when the data packet is received at the parallel input to the serializer/deserializer 104. The gearbox 284 operation for accomplishing this involves temporary storage of wrap around bits. This makes the propagation delay through gearbox 284 and serdes 104 vary over time. Accordingly, the adaptation unit or gearbox 284 provides to the time stamp agent 278, in embodiments, a sync signal 290 indicating the operation of the adaptation unit or gearbox 284. Using the sync signal 290, the time stamp agent 278 is operable to determine the time delay to the time at which bit b0 of a particular data packet will be transmitted on the serial data stream 286 from the serializer/deserializer unit 104, and by adjusting a time representation received from the time agent 280, is operable to record, process and insert time stamp data at time $t_{TS}$ that indicates the future time $t_0$ at which bit b0 will be transmitted.

Figure 12:
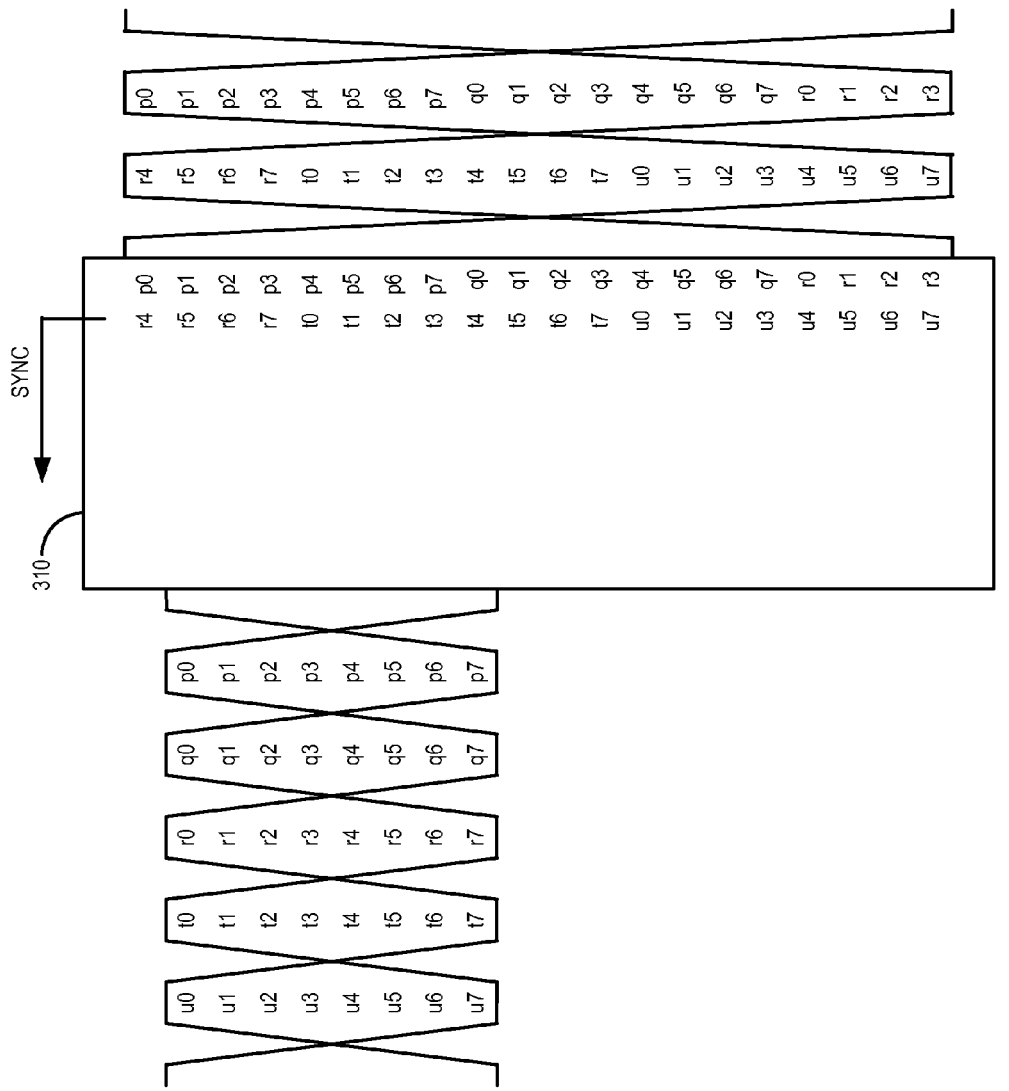
FIG. 12 illustrates an example data stream on a second embodiment of another portion of the data paths depicted in FIGS. 10A and 10B.

In embodiments, the network device 100 implements a gearbox first-in-first-out (FIFO) module, referred to herein simply as a gearbox, instead of an adjustment unit. FIG. 12 illustrates the principle of operation of a gearbox 310 having an input word width of 8 bits and an output word width of 20 bits. The input side of the gearbox 310 must read in 2.5 8-bit words of data for every 20-bit word of data output. Accordingly, the input and output of the gearbox 310 operate at different frequencies, which frequencies will be in sync only at specific times. The latency in embodiments implementing the gearbox varies over time in a non-trivial, but predictable manner. A sync signal from the gearbox to the time stamp agent allows a series of correction values to be applied to the time stamps such that the applied time stamp reflects the time of arrival of packets. The corrections are scaled by the cycle time of the gearbox and a jumping sequence of values reflecting the gearbox latency variations is created. In some embodiments, this is accomplished with an integrator with a mod n divider. The time of a data packet's departure from or arrival at the network device 100 can be accurately reflected in a time stamp by combining compensation for fixed delays with compensation for variable delays. In embodiments, fixed delays can be compensated for by setting the local real time clock (i.e., the RTC in the time agent providing the time representation to the time stamp agent) later or earlier by an amount reflecting the time required for fixed delay processing happening between the desired and actual points of time stamping. By further adjusting the adjusted RTC time representation dynamically by an amount equaling the gearbox latency, an accurate time stamp value can be recorded and processed for data packets.

Figure 13:
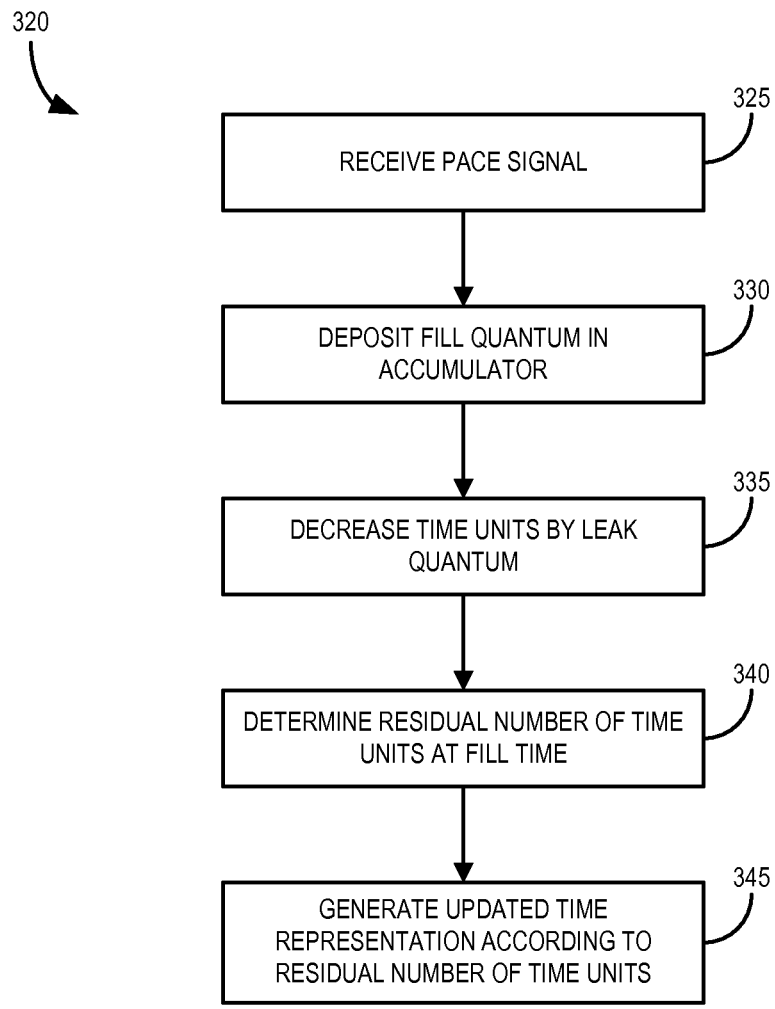
FIG. 13 is a flow chart depicting an example method for determining a time representation in a network device in accordance with an embodiment.

Turning to now to FIG. 13, a flow chart depicts an embodiment of a method 320 for determining a time representation in packet processing units of a network device. The packet processing unit receives a master pace signal corresponding to a time representation based on a master real time clock in a master clock domain (block 325). The master pace signal is generated at a first frequency. In embodiments, the master clock domain includes a time control block that is also on the network device. In any event, a fill quantum of time units is deposited into a time accumulator (also referred to as a "leaky bucket") based on the master pace signal (block 330). For example, in embodiments, the master pace signal includes a periodic "fill" command or signal, and each time the fill command or signal is received, the fill quantum of time units is deposited. In embodiments, the time accumulator is in a target clock domain, and the master pace signal is received in the target clock domain, according to a local clock signal. The accumulation of time units in the time accumulator is decreased by a leak quantum according to the clock signal in the clock domain of the time accumulator (e.g., according to the local clock signal in the target clock domain) (block 335). In an embodiment, the local clock signal runs at a higher frequency than the master pace signal.

An updated time representation is generated periodically in clock domain of the time accumulator (e.g., in the target clock domain) based on the residual number of time units in the time accumulator before a fill command is executed (i.e., before an additional fill quantum of time units is deposited in the time accumulator) (block 345). In embodiments, the updated time representation has finer granularity and a precision better than the leak quantum.

In embodiments, generating the updated time representation includes determining, from the residual number of time units just before a fill quantum is added, an adjustment value such that the updated time representation in the target clock domain is valid at a desired instant within the clock cycle of the local clock signal. Accordingly, in some embodiments, the master pace signal is a composite signal that indicates both a periodic fill command and a periodic check command. When this pace signal is received (block 340), the signal is decoded and, for each fill command, a fill quantum of time units is deposited into the time accumulator. When a check command is received, the residual number of time units in the time accumulator is strobed into a register. In embodiments, each check command is contemporaneous with a fill command, and the residual number of time units is strobed into the register in an instant before an additional fill quantum of time units is deposited. In embodiments, the method includes comparing the time units accumulated in the time accumulator to an upper threshold and to a lower threshold, and adjusting the leak quantum of time units if the time units accumulated in the time accumulator is above the upper threshold or below the lower threshold.

Figure 14:
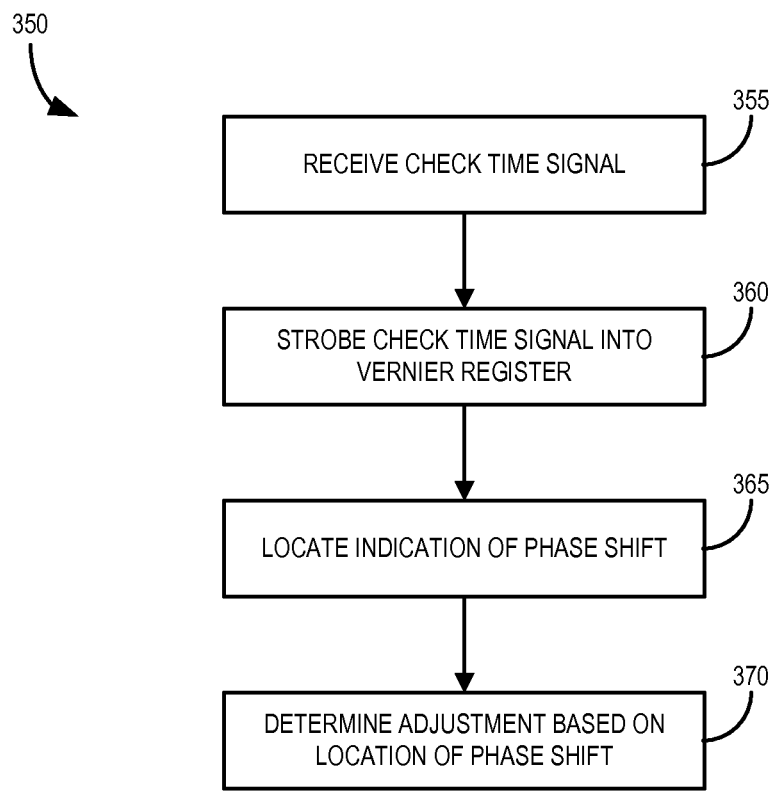
FIG. 14 is a flow chart depicting an example method for determining time in a network device in accordance with an embodiment.

Turning to now to FIG. 14, a flow chart depicts an embodiment of a method 350 for determining time in a network device. A check time signal generated in a master clock domain having a master clock signal is received in a target clock domain (block 355). The check time signal comprises at least a pulse train, in embodiments. In embodiments, the frequency of the pulse train is close to, but not equal to, one-half the frequency of a clock signal in the target clock domain. The pulse train has a duration long enough that, at the selected frequency, as it crosses the boundary between the master and target clock domains, at least one phase shift will occur, in embodiments. The value of the pulse train signal is strobed into a vernier register (e.g., a shift register) during each cycle of the local clock signal for the duration of the pulse train (block 360). The vernier register will have recorded the phase shift, the location of which can be located in the register (block 365). Using the location of the phase shift in the vernier register, an adjustment is determined such that an adjusted time representation generated in the target clock domain is accurate with sub-cycle resolution in the target clock domain (block 370). In embodiments, a composite check time signal can be used. Then the first toggle or pulse of the pulse train causes a read of the target clock domain RTC to determine the phase of the target clock domain RTC with an accuracy down to the target clock domain cycle time, by strobing the value of the real time clock in the target clock domain into a check time register. The slip point recorded in the vernier register during the following cycles, is then used for refining the check time value down to sub-cycle resolution. In embodiments, the resulting time representation value is stored in a check time register for comparison to a time representation value from a real time clock in the master clock domain captured at the same check time instant. and an adjustment determined therefrom. The adjustment value can, in embodiments, be used for adjusting the target RTC or be stored in a register and used to obtain adjusted time representations when reading the real time clock in the target clock domain.

Figure 15:
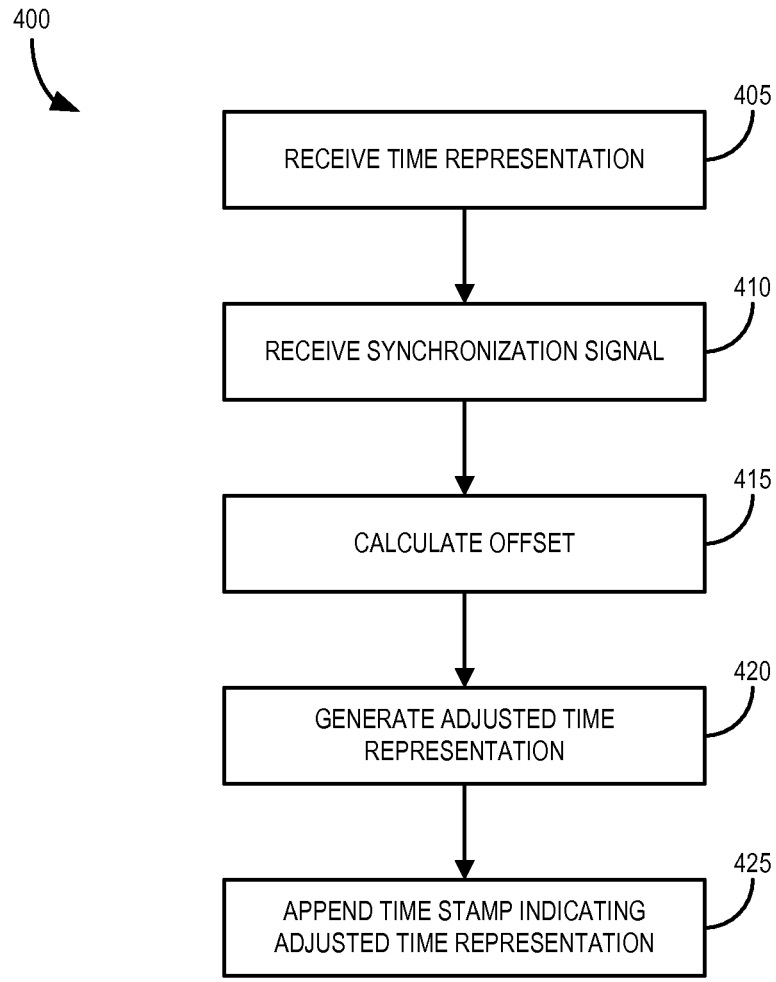
FIG. 15 is a flow chart depicting an example method for determining an adjusted time representation in a network device.

Turning to now to FIG. 15, a flow chart depicts an embodiment of a method 400 for determining an adjusted time representation in a network device. A time stamp unit receives a time representation for a data packet in relation to a start-of-packet (SOP) indicator (block 405). The SOP indicator is represented either in-band as a block of bits having a defined bit pattern, or as side-band information, in embodiments. The time stamp unit also receives a synchronization signal generated by an adjustment unit (block 410). The synchronization signal is a pulse in some embodiments, but is a signal indicating a numeric value and, in particular, a numeric value indicating a number of bits by which the associated data are shifted, in other embodiments. In any event, an offset is calculated, according to at least the synchronization signal, between the time indicated by the time representation and a time at which the SOP indicator was received as serial data at a serializer/deserializer unit (block 415). An adjusted time representation is determined according to the calculated offset (block 420), and the adjusted time representation is associated, appended, processed, or inserted as a time stamp to the data packet (block 425).

In embodiments, the serializer/deserializer receives a serial bit stream and converts the serial bit stream to a series of parallel words of a first word width. The parallel words of the first word width are received by the adjustment unit coupled to the serializer/deserializer unit, which transforms the word width and word rate such that the output parallel word width matches an integer number of symbols or block code units. The adjustment unit generates the synchronization signal which, in embodiments, indicates the number of bits by which the adjustment unit shifted the current output word.

Figure 16:
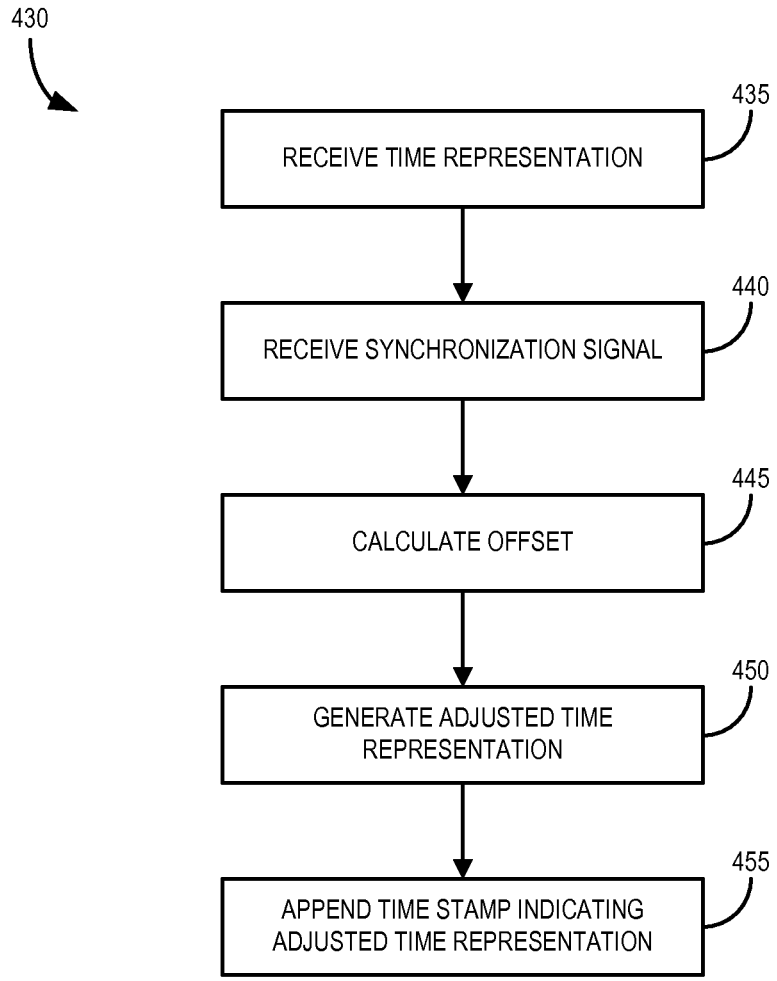
FIG. 16 is a flow chart depicting another example method for determining an adjusted time representation in a network device.

With reference to FIG. 16, a flow chart depicts an embodiment of a method 430 for determining an adjusted time representation in a network device. A time stamp unit receives a time representation for a data packet in relation to a start-of-packet (SOP) indicator (block 435). The SOP indicator is represented either in-band as a block of bits having a defined bit pattern, or as side-band information, in embodiments. The time stamp unit also receives a synchronization signal generated by an adjustment unit (block 440). The synchronization signal is a pulse in some embodiments, but is a signal indicating a numeric value and, in particular, a numeric value indicating a number of bits by which the associated data are shifted, in other embodiments. In any event, an offset is calculated, according to at least the synchronization signal, between the time indicated by the time representation and a time at which the SOP indicator will be transmitted as serial data from a serializer/deserializer unit (block 445). An adjusted time representation is determined according to the calculated offset (block 450), and the adjusted time representation is associated, appended, processed, or inserted as a time stamp to the data packet (block 455).

In embodiments, the data packet with the associated, appended, processed, or inserted time stamp data is sent to the adjustment unit as parallel word data of a first word width. The adjustment unit generates parallel word data of a second word width and sends the parallel word data of the second word width to the serializer/deserializer unit, which transmits the data packet as serial data.

It is noted that the time agents 122, 132, 208, and 222, and the time stamp agents 130, 140, 216, and 230, while depicted as part of the packet interfaces 120 and 206, are instantiated, additionally or alternatively, in other parts of a network device, in some embodiments. Similarly, it is noted that while the time control block 108 is described and depicted in this specification as part of the network device, the time control block is an external or discrete device in some embodiments.

While the principles of the disclosure have been described above in connection with specific apparatuses and methods, it is noted that this description is made only by way of example and not as limitation on the scope of the invention. Additionally, at least some of the various blocks, operations, and techniques described above may be implemented in hardware, a processor or computer executing firmware and/or software instructions, or any combination thereof. The software or firmware instructions may include computer readable or machine readable instructions stored on a memory of another one or more computer readable or machine readable storage medium that, when executed by the processor, cause the processor to perform various acts. When implemented in hardware, the hardware may comprise one or more of discrete components, an integrated circuit, an application-specific integrated circuit, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for determining a time representation in a network device, the method comprising:
   receiving, at a target clock domain of the network device, a master pace signal corresponding to a time representation based on a master real time clock in a master clock domain, the master pace signal being generated, in the master clock domain, at a first frequency;
   depositing, in a time accumulator in the target clock domain of the network device, a fill quantum of time units based on the master pace signal;
   decreasing the time units in the time accumulator by a leak quantum according to a local clock signal in the target clock domain, the local clock signal running at a higher frequency than the master pace signal; and
   periodically generating, at a granularity corresponding to the frequency of the local clock signal, an updated time representation in the target clock domain based on a residual number of time units in the time accumulator before depositing an additional fill quantum of time units in the time accumulator.

2. A method according to claim 1, wherein generating an updated time representation comprises determining from the residual number of time units an adjustment value such that the updated time representation in the target clock domain is valid at a desired instant within the cycle of the local clock signal.

3. A method according to claim 1, further comprising:
   comparing the time units accumulated in the time accumulator to an upper threshold and to a lower threshold; and
   adjusting the leak quantum of time units if the time units accumulated in the time accumulator is above the upper threshold or below the lower threshold.

4. A method according to claim 1, wherein:
   receiving a master pace signal comprises receiving a composite signal indicating a periodic fill command and a periodic check command;
   depositing in a time accumulator of the network device a fill quantum of time units based on the master pace signal comprises depositing the time units based on the fill command; and
   determining the residual number of time units in the time accumulator based on the check command.

5. A method according to claim 1, wherein the time representation is generated in a real time clock in the target clock domain, and wherein the value of the leak quantum is used by the real time clock in the target clock domain to increment the time representation on a per-cycle basis according to the local clock signal.

6. A network device comprising:
   a time agent, in a target clock domain, configured to receive a master pace signal corresponding to a time representation based on a master real time clock in a master clock domain, the master pace signal generated at a first frequency;
   a local clock generating in the target clock domain a local clock signal at a higher frequency than the master real time clock signal;
   a time accumulator, in the target clock domain, configured to (i) accumulate time units and to add a fill quantum of time units to the time accumulator based on the master pace signal and (ii) decrease the accumulated time units by a leak quantum according to the local clock signal;
   a real time clock in the target clock domain configured to generate a time representation in the target clock domain, the real time clock in the target clock domain incrementing the real time representation in the target clock domain according to the local clock signal and the leak quantum; and
   correction logic configured to generate, periodically and at a granularity corresponding to the frequency of the local clock signal, an updated time representation in the target clock domain based on a residual number of time units in the time accumulator before adding an additional fill quantum of time units in the time accumulator.

7. A network device according to claim 6, wherein the correction logic is configured to determine from the residual number of time units an adjustment value such that the updated time representation in the target clock domain is valid at a desired instant within the cycle of the local clock signal.

8. A network device according to claim 6, further comprising:
   logic configured to compare the time units accumulated in the time accumulator to an upper threshold and to a lower threshold; and
   a servo configured to adjust the leak quantum of time units if the time units accumulated in the time accumulator is above the upper threshold or below the lower threshold.

9. A network device according to claim 8, wherein the servo is configured to (i) read from a register an adjustment constant, (ii) adjust the leak quantum by the adjustment constant in a positive direction if the time units accumulated in the time accumulator exceed the upper threshold, and (iii) adjust the leak quantum by the adjustment constant in a negative direction if the time units accumulated in the time accumulator falls below the lower threshold.

10. A network device according to claim 6, further comprising a decoder configured to receive the master pace signal and to decode from the master pace signal a periodic fill command and a period check command; wherein:
   the time accumulator is configured to add the fill quantum of time units based on the fill command, and
   the correction logic is configured to determine the residual number of time units in the time accumulator based on the check command.

11. A method for determining time in a network device, the method comprising:
   receiving, in a target clock domain of the network device, a check time signal generated in a master clock domain having a master clock signal;
   strobing, into a shift register in the target clock domain, the value of the check time signal during each cycle of a local clock signal for the duration of the check time signal;
   locating in the shift register an indication of a phase shift between the check time signal and the local clock signal; and
   determining, according to the location of the phase shift in the shift register, an adjustment such that an adjusted time representation generated in the target clock domain is accurate to a local clock sub-cycle degree of precision.

12. A method according to claim 11, wherein receiving the check time signal comprises receiving a pulse train signal toggling at a defined rate for a defined number of pulse train cycles.

13. A method according to claim 12, wherein the defined rate and the defined number of pulse train cycles are selected such that, when the check time signal is received in the target clock domain according to a target clock signal of the target clock domain, the received signal will exhibit at least one phase shift during the check time signal.

14. A method according to claim 11, further comprising strobing into a check time register the value of a real time clock operating in the target clock domain upon receiving in the target clock domain a first pulse of the check time signal; wherein determining the adjustment is further based on the value of the real time clock in the check time register.

15. A method according to claim 14, further comprising:
   storing in a register a value corresponding to the adjustment; and
   adjusting a time representation output by the real time clock by the stored adjustment value to obtain the adjusted time representation.

16. A network device comprising:
   a time agent, in a target clock domain, configured to receive a check time signal generated in a master clock domain having a master clock signal;
   a local clock in the target clock domain generating a local clock signal;
   a real time clock in the target clock domain configured to generate a time representation in the target clock domain;
   a shift register, in the target clock domain, configured to receive the values of the check time signal during each cycle of the local clock signal for the duration of the check time signal;
   logic, in the target clock domain, configured to locate in the shift register an indication of a phase shift between the check time signal and the local clock signal; and
   logic, in the target clock domain, configured to determine, according to the location of the phase shift in the shift register, an adjustment such that an adjusted time representation generated in the target clock domain is accurate to a local clock sub-cycle degree of precision.

17. A network device according to claim 16, further comprising a check time trigger configured to receive and interpret a check time signal comprising at least a command for strobing the real time clock in the target clock domain.

18. A network device according to claim 16, further comprising:
   a check time register; and
   a check time trigger configured to strobe into the check time register the value of the real time clock in the target domain upon firing the trigger;
   wherein the logic configured to determine the adjustment further uses the value of the real time clock in the check time register.

19. A network device according to claim 16, further comprising:
   a register configured to store a value corresponding to the adjustment; and
   logic configured to adjust the time representation by the stored adjustment value to obtain the adjusted time representation.

20. A network device according to claim 16, further comprising a second real time clock in the target clock domain configured to generate a second time representation in a second format in the target clock domain.

21. A network device according to claim 16, further comprising a second real time clock in the target domain configured to generate a second time representation in a second format and a third time representation in a third format in the target clock domain.

* * * * *